United States Patent
Fishman et al.

(10) Patent No.: US 6,992,406 B2
(45) Date of Patent: Jan. 31, 2006

(54) INDUCTION HEATING OR MELTING POWER SUPPLY UTILIZING A TUNING CAPACITOR

(75) Inventors: Oleg S Fishman, Maple Glen, PA (US); George Georgopoulos, Pine Brook, NJ (US)

(73) Assignee: Inductotherm Corp., Rancocas, NJ (US)

(*) Notice: Subject to any disclaimer, the term of this patent is extended or adjusted under 35 U.S.C. 154(b) by 187 days.

(21) Appl. No.: 10/784,079

(22) Filed: Feb. 21, 2004

(65) Prior Publication Data

US 2004/0178680 A1 Sep. 16, 2004

Related U.S. Application Data

(63) Continuation-in-part of application No. 10/217,081, filed on Aug. 12, 2002, now Pat. No. 6,696,770.

(60) Provisional application No. 60/312,159, filed on Aug. 14, 2001.

(51) Int. Cl.
*H05B 6/04* (2006.01)

(52) U.S. Cl. .................. 307/154; 219/670; 219/666

(58) Field of Classification Search ............. 219/670, 219/666, 660, 661, 662, 671; 307/154
See application file for complete search history.

(56) References Cited

U.S. PATENT DOCUMENTS 4,638,138 A * 1/1987 Rosa et al. ............. 219/668

* cited by examiner

*Primary Examiner*—Shawn Riley
(74) *Attorney, Agent, or Firm*—Philip O. Post

(57) ABSTRACT

A rectifier/inverter power supply for use with induction heating or melting apparatus includes a tuning capacitor connected across the output of the rectifier and input of the inverter. The tuning capacitor forms a resonant circuit with an inductive load coil at the operating frequency of the inverter. Additionally, the load coil may be formed from an active load coil connected to the output of the inverter and a passive load coil, in parallel with a resonant tuning capacitor.

10 Claims, 15 Drawing Sheets

LEGEND:
16 — COIL TUNING CAPACITOR SECTION OF POWER SUPPLY
L9 — INDUCTION COIL LOAD
L8 — CURRENT LIMITING REACTOR

LEGEND:
16 — COIL TUNING CAPACITOR SECTION OF POWER SUPPLY
L9 — INDUCTION COIL LOAD
L8 — CURRENT LIMITING REACTOR

LEGEND:
16 — COIL TUNING CAPACITOR SECTION OF POWER SUPPLY
L9 — INDUCTION COIL LOAD
L8 — CURRENT LIMITING REACTOR

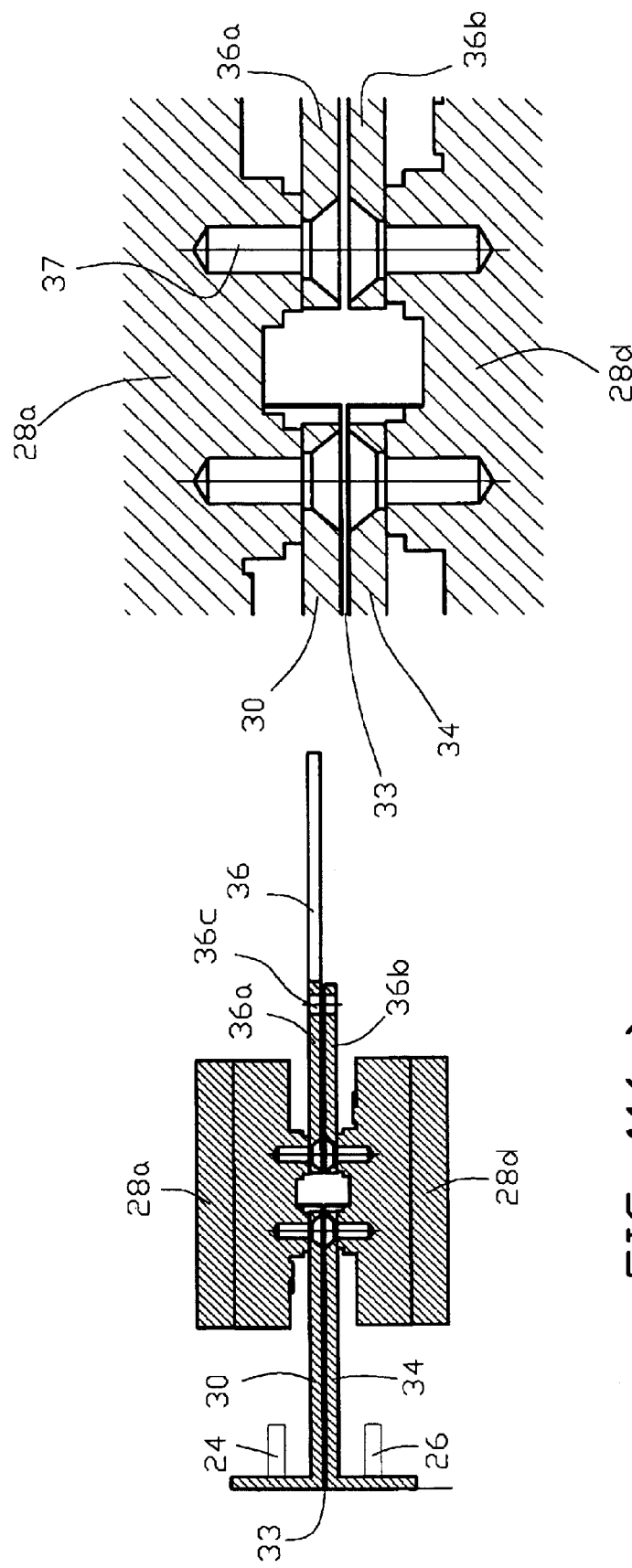

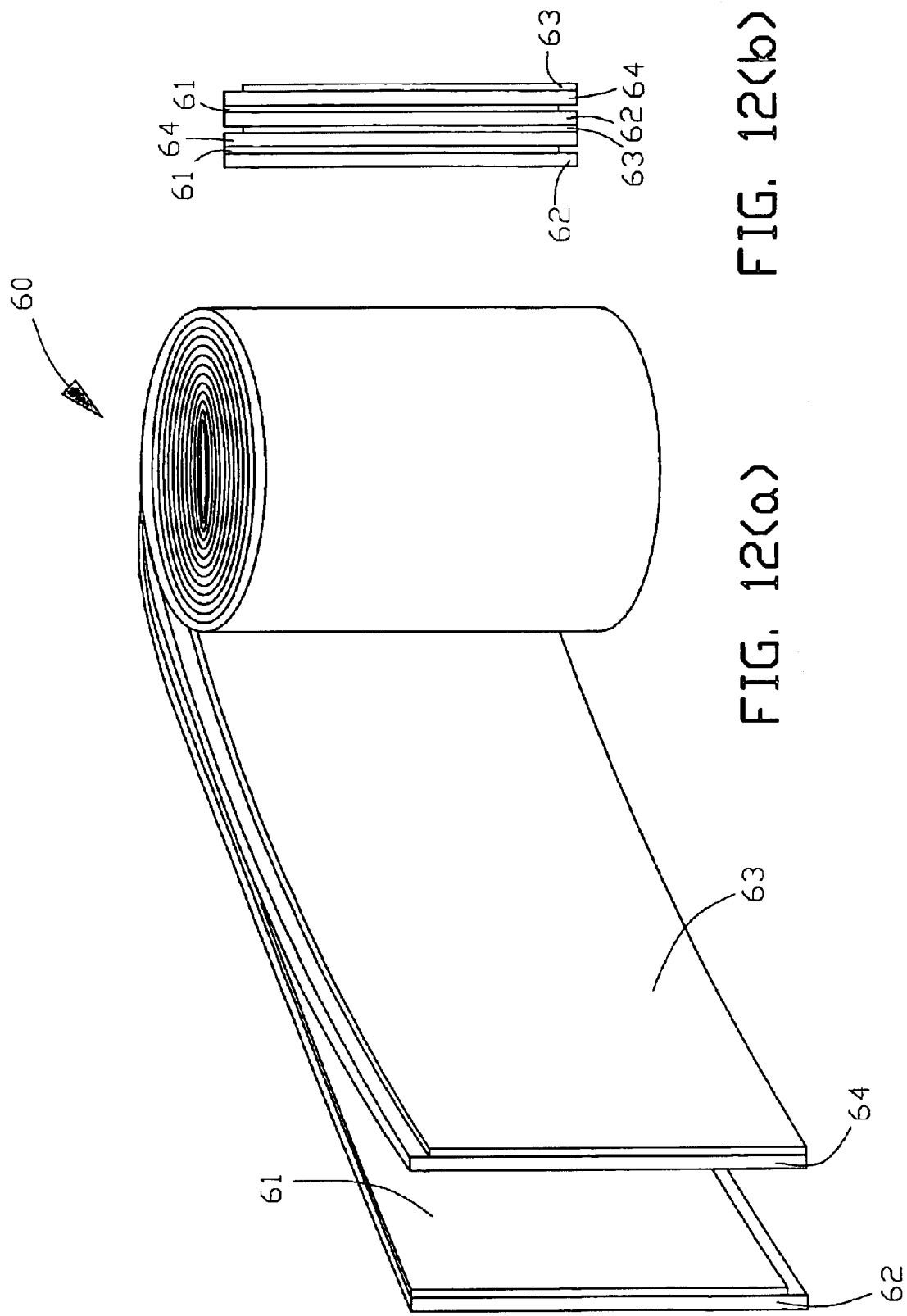

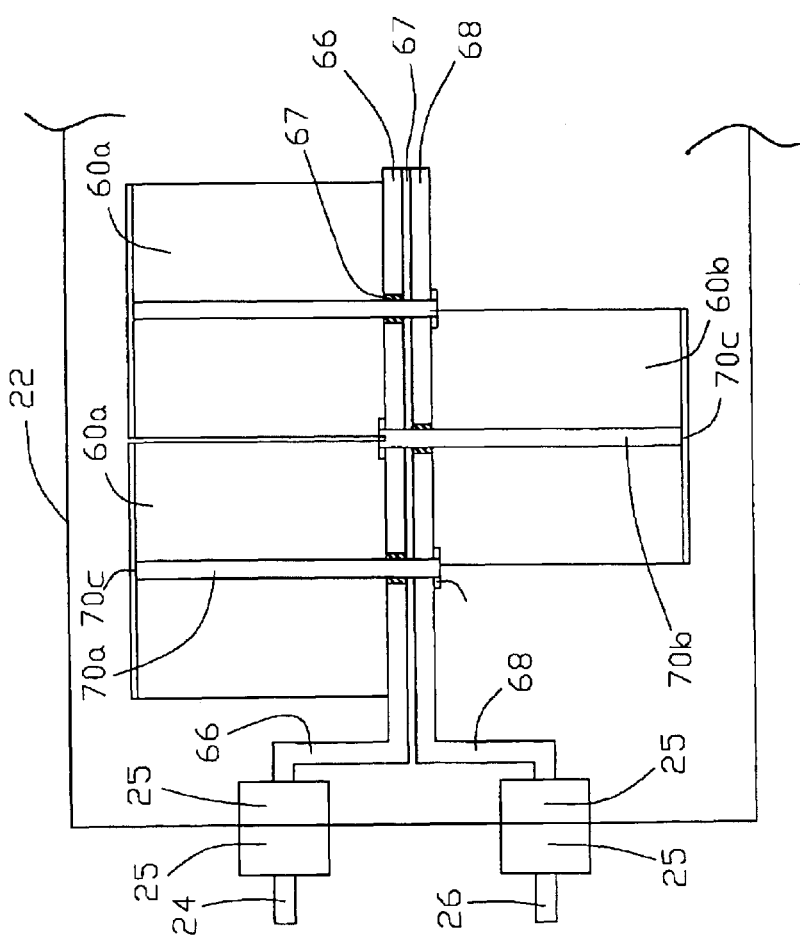
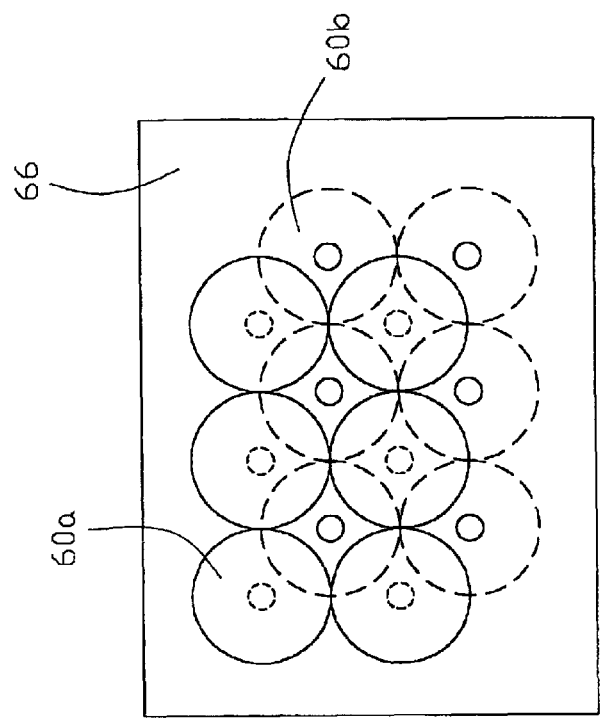
FIG. 13(a)
FIG. 13(b)

US 6,992,406 B2

INDUCTION HEATING OR MELTING POWER SUPPLY UTILIZING A TUNING CAPACITOR

CROSS REFERENCE TO RELATED APPLICATIONS

This application is a continuation-in-part of U.S. application Ser. No. 10/217,081, filed Aug. 12, 2002, now U.S. Pat. No. 6,696,770, which claims priority to provisional patent application Ser. No. 60/312,159, filed Aug. 14, 2001, the entirety of each of which are incorporated herein by reference.

FIELD OF THE INVENTION

The present invention relates to an ac power supply for use in induction heating or melting applications wherein the induction power circuit is resonantly tuned.

BACKGROUND OF THE INVENTION

FIG. 1 illustrates a conventional power supply 110 that is used in induction heating or melting applications. The power supply consists of an ac-to-dc rectifier and filter section 112, a dc-to-ac inverter section 120 and a tuning capacitor section 130. For the power supply shown in FIG. 1, a three-phase diode bridge rectifier 114 converts three-phase (A, B, C) ac utility line power into dc power. Current limiting reactor $L_{108}$ smoothes out the ripple in the output dc current of the rectifier, and capacitor $C_{108}$ filters the ac component from the output dc voltage of the rectifier. The filtered dc output of the rectifier is inverted to ac by a full-bridge inverter consisting of solid state switches $S_{101}$, $S_{102}$, $S_{103}$ and $S_{104}$ and associated antiparallel diodes $D_{101}$, $D_{102}$, $D_{103}$ and $D_{104}$, respectively. Alternating turn-on/turn-off cycles of switch pairs $S_{101}/S_{103}$ and $S_{102}/S_{104}$ produce a synthesized ac inverter output at terminals 3 and 4.

Induction load coil $L_{101}$, represents the power coil used in the induction heating or melting application. For example, in an induction furnace, load coil $L_{101}$, is wound around the exterior of a crucible in which metal charge has been placed. In an induction heating application, a metal workpiece, such as a strip or wire, may travel through a helical winding of load coil $L_{101}$, or otherwise be brought near to the coil to inductively heat the workpiece. Current supplied by the power supply and flowing through load coil $L_{101}$ creates a magnetic field that either directly heats the metal charge or workpiece by magnetic induction, or heats the workpiece by heat conduction from a susceptor that is heated by magnetic induction. Load coil $L_{101}$, whether it be a single coil or an assembly of interconnected coil sections, has a very low operating power factor. Because of this, a tuning capacitor (or bank of capacitors), such as capacitor $C_{101}$ must be provided in the load coil circuit to improve the overall power factor of the load coil circuit. These tuning capacitors are a significant cost and volume component of the power supply. Therefore, there exists the need for a power supply for inductive heating or melting applications that utilizes smaller and less costly tuning capacitors.

An objective of the present invention is to provide a power supply for inductive heating or melting applications that utilizes a capacitor connected between the output of the rectifier and the input of the inverter to form a resonantly tuned circuit with the induction load coil used in the application.

BRIEF SUMMARY OF THE INVENTION

In one aspect, the present invention is apparatus for, and a method of, providing a power supply with rectifier and inverter sections for use with an induction load coil wherein a tuning capacitor is provided across the output of the rectifier and the input of the inverter to form a resonant circuit with the induction load coil. The induction load coil may comprise an active load coil connected to the output of the inverter, and a passive load coil connected in parallel with a capacitor to form a tank circuit. Other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 11(a) is a cross sectional view of the physical arrangement of the inverter shown in FIG. 10 along line A—A.

FIG. 11(b) is a cross sectional enlarged detail of the view in FIG. 11(a).

FIG. 12(a) is an isometric of a typical film capacitor.

FIG. 12(b) is a cross section of the film capacitor shown in FIG. 12(a).

FIG. 13(a) and FIG. 13(b) are one example of the physical arrangement of the tuning capacitor shown in FIG. 10.

DETAILED DESCRIPTION OF THE INVENTION

Figure 1:
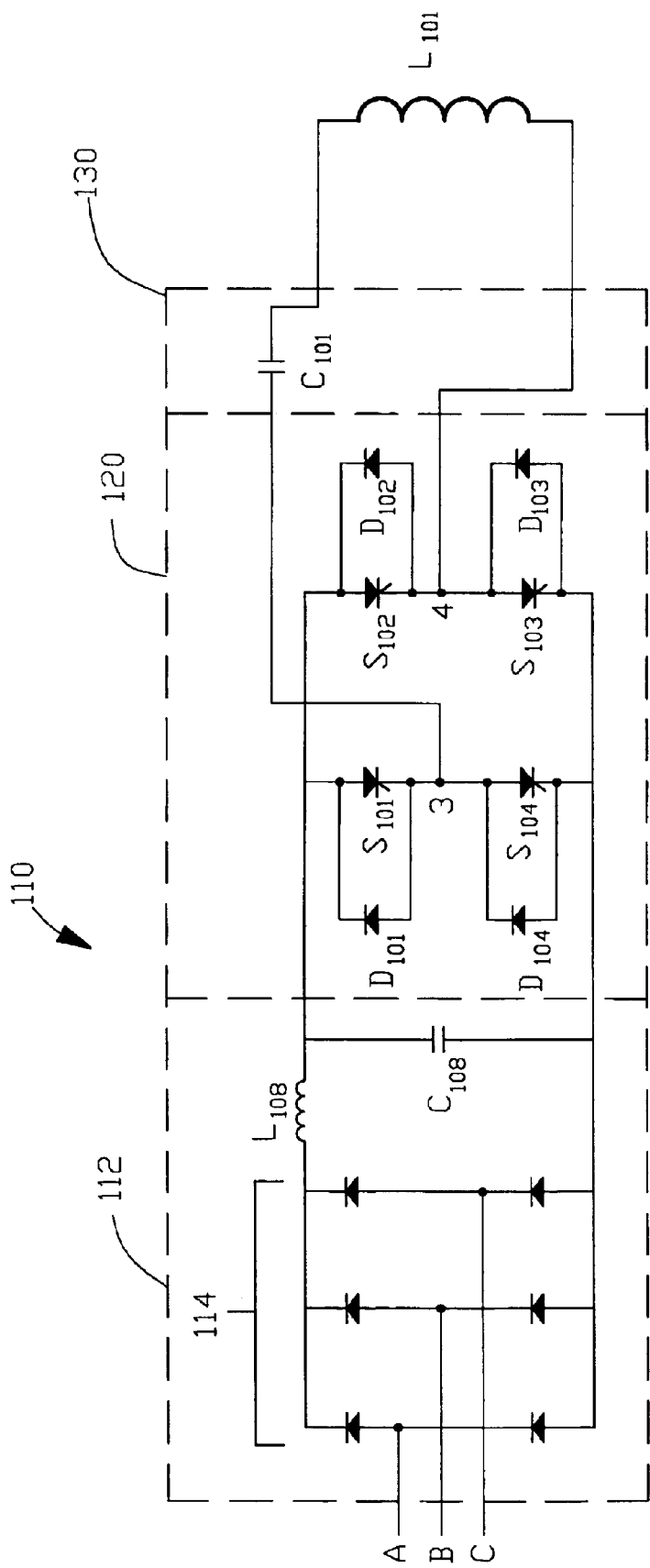
FIG. 1 is a schematic diagram of a prior art power supply with a full-bridge inverter that is used in induction heating and melting applications.
Figure 2:
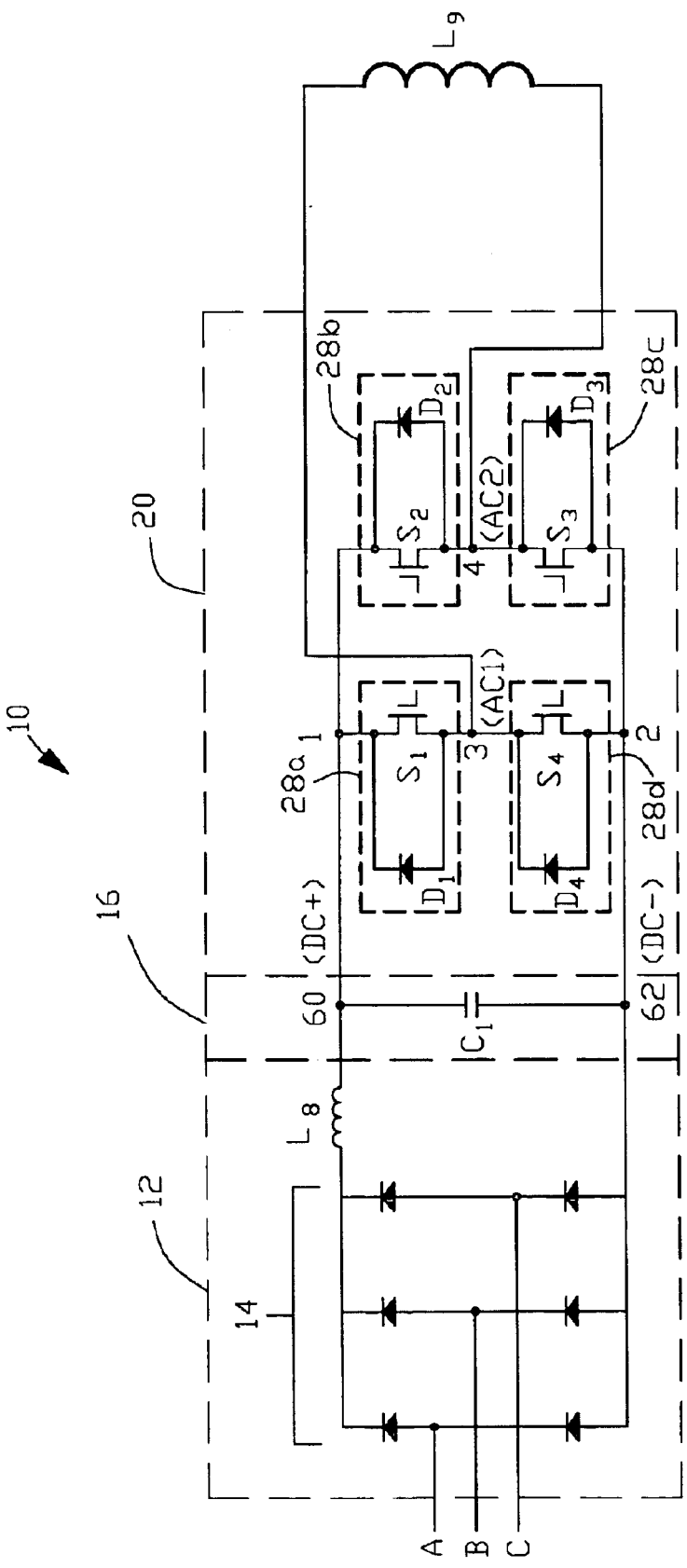
FIG. 2 is a schematic diagram of one example of the power supply of the present invention for use in induction heating or melting applications.

Referring to the drawings, wherein like numerals indicate like elements, there is shown in FIG. 2 an illustration of one example of power supply 10 of the present invention for use in induction heating or melting applications. Ac-to-dc rectifier and filter section 12 includes an ac-to-dc rectifier. A multi-phase rectifier, in this non-limiting example of the invention, a three-phase diode bridge rectifier 14 is used to convert three-phase (A, B, C) ac utility line power into dc power. Optional current limiting reactor $L_g$ smoothes out the ripple from the output dc current of the rectifier. Section 16 of the power supply diagrammatically illustrates coil tuning capacitor $C_1$, which can be a single capacitor or a bank of interconnected capacitors that form a capacitive element.

In FIG. 2, the dc output of the rectifier is supplied to input terminals 1 and 2 of a full-bridge inverter in inverter section 20. The inverter consists of solid state switches $S_1$, $S_2$, $S_3$ and $S_4$ and associated antiparallel diodes $D_1$, $D_2$, $D_3$ and $D_4$, respectively. Alternating turn-on/turn-off cycles of switch pairs $S_1/S_3$ and $S_2/S_4$ produce a synthesized ac inverter output at terminals 3 and 4. A preferred, but not limiting, choice of component for the solid state switch is an isolated gate bipolar transistor (IGBT), which exhibits the desirable characteristics of power bipolar transistors and power MOSFETs at high operating voltages and currents. In one example of the invention, the inverter employs a phase-shifting scheme (pulse width control) relative to the turn-on/turn-off cycles of the two switch pairs whereby variable overlapping on-times for the two switch pairs is used to vary the effective RMS output voltage of the inverter.

Induction load coil $L_9$ represents the power coil used in the induction heating or melting apparatus. The capacitance of capacitor $C_1$ is selected to form a resonant circuit with the impedance of load coil $L_9$ at the operating frequency of the inverter, which is the switching rate of the switch pairs used in the inverter. Consequently, a tuning capacitor is not required at the output of the inverter. Selection of available circuit components may not allow operation exactly at resonance, but as close to resonance as is achievable with available components. The ac current flowing through induction load coil $L_9$ from the output of the inverter magnetically couples with an electrically conductive material, which may be, for example, a conductive metal or a susceptor.

Figure 3:
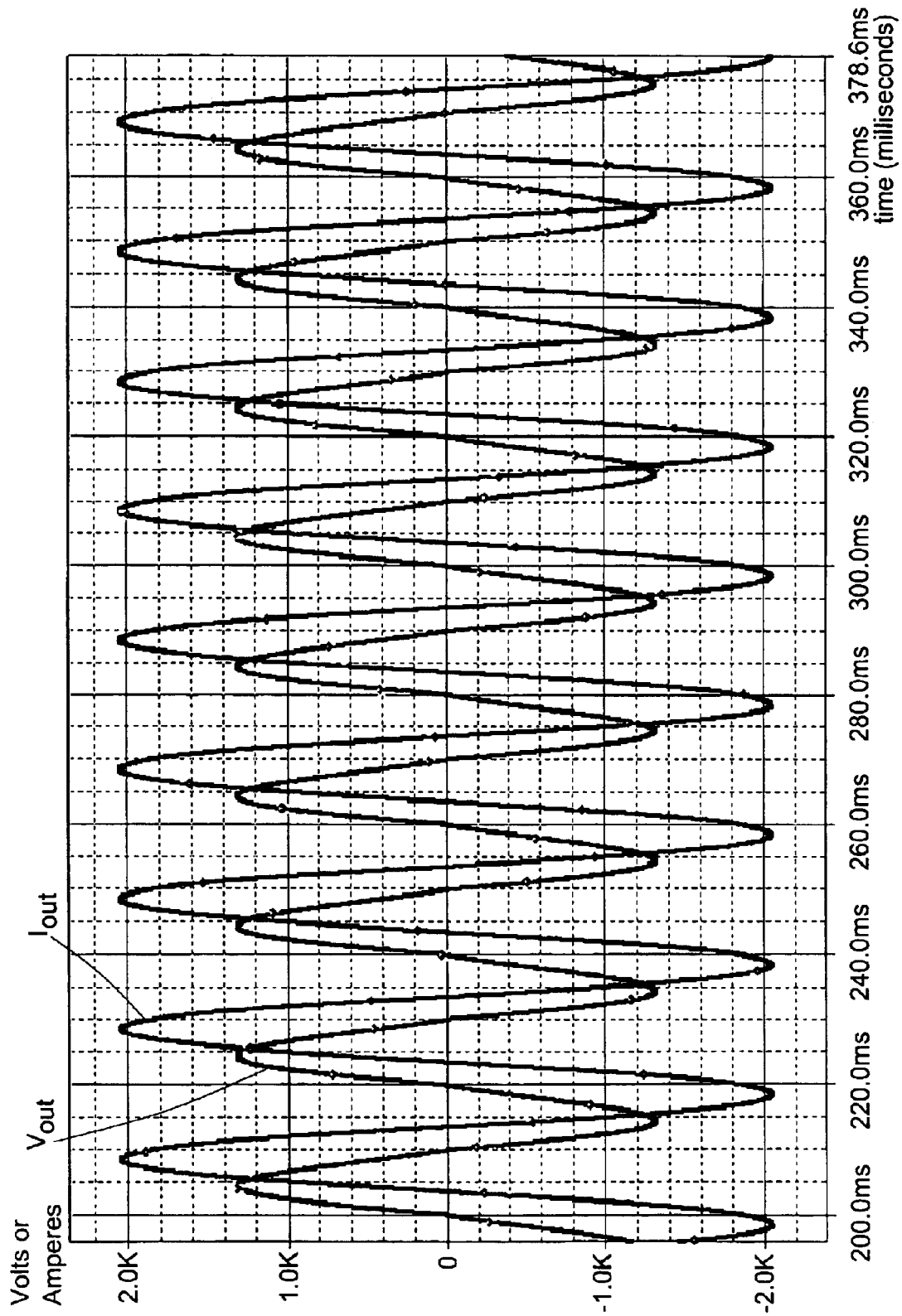
FIG. 3 is a waveform diagram illustrating the inverter's output voltage and current for one example of the power supply of the present invention.
Figure 4:
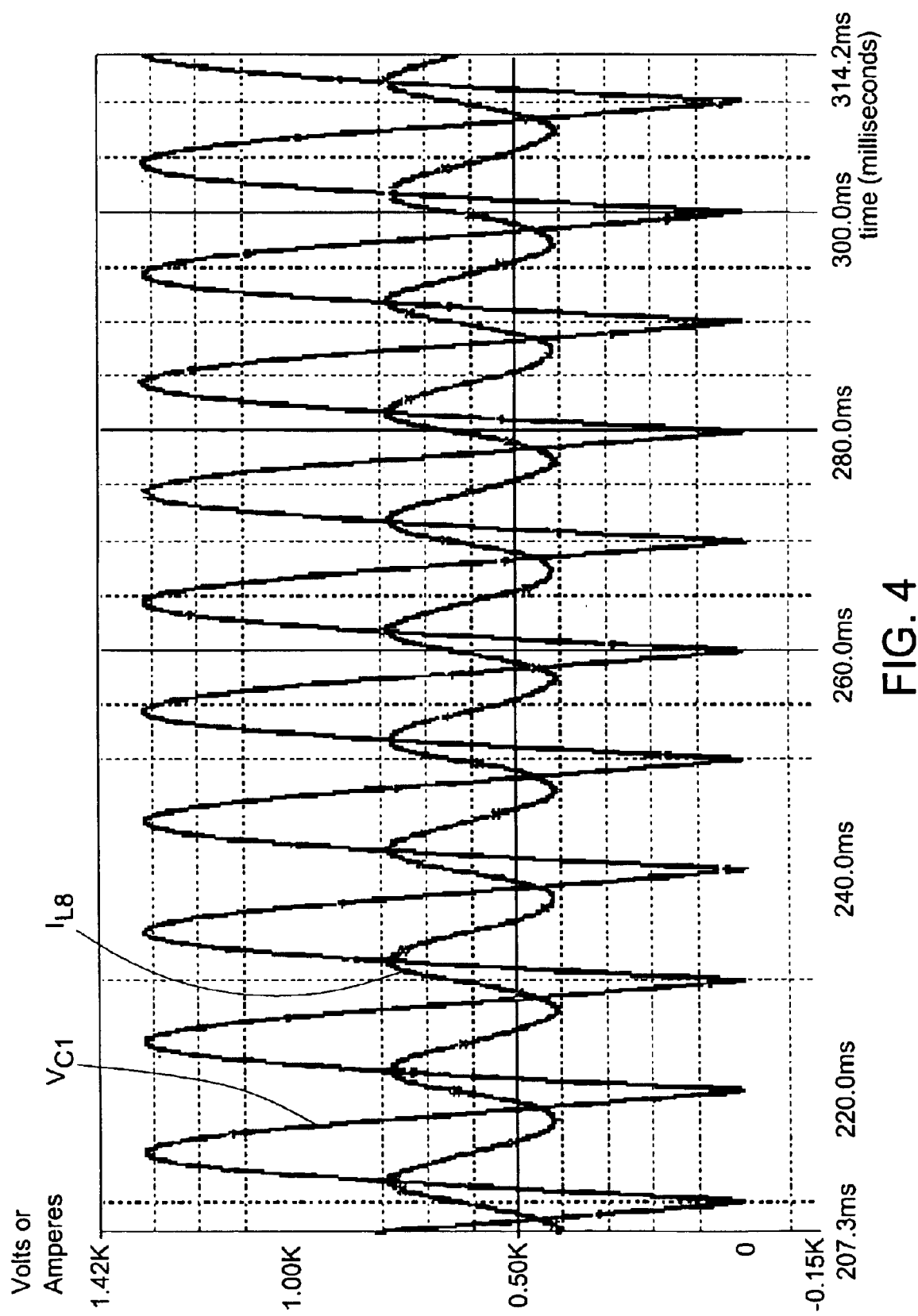
FIG. 4 is a waveform diagram illustrating the voltage across a tuning capacitor and the current through a line filtering reactor used in one example of the power supply of the present invention.
Figure 5:
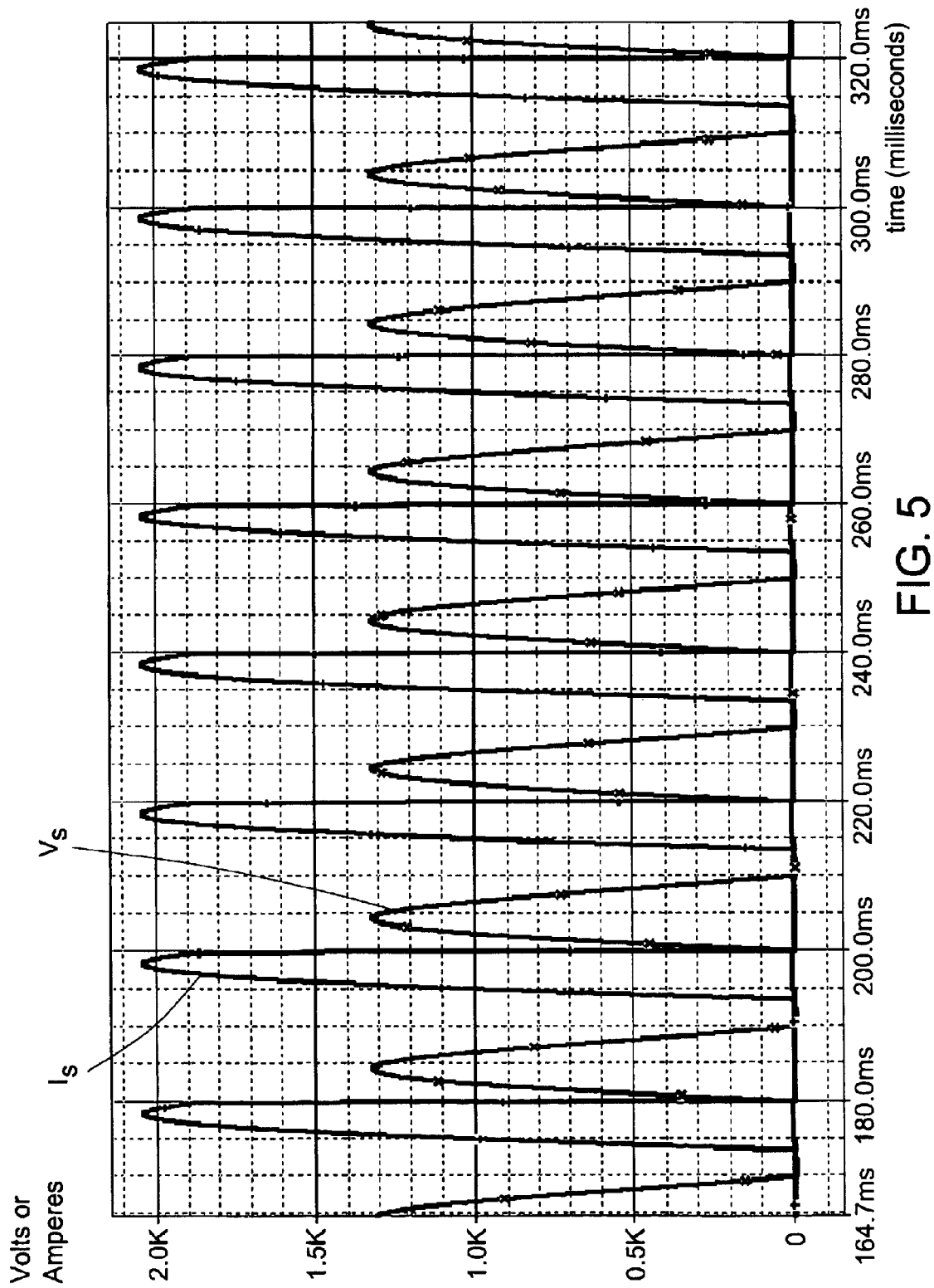
FIG. 5 is a waveform diagram illustrating the voltage across, and current through, a switching device used in the inverter in one example of the power supply of the present invention.

FIG. 3 through FIG. 5 illustrate the performance characteristics for power supply 10 of the present invention as shown in FIG. 2 with input utility line power (A, B, C) of 480 volts line-to-line, 60 Hertz, and inverter 20 operating at an output frequency of 60 Hz. For this particular non-limiting example: $L_g$ is selected as 5,000 $\mu$H (for an impedance of 3.77 ohms at the rectifier ripple output frequency of 120 Hz); $C_1$ is selected as 5,000 $\mu$F (for an impedance of 0.27 ohms at the rectifier ripple output frequency of 120 Hz); and $L_9$ is selected as 1,000 $\mu$H (for an impedance of 0.38 ohms at the inverter output frequency of 60 Hz). Not shown in FIG. 2, but used in this sample analysis is a resistance of 0.16 ohms for induction load coil $L_9$. Operating the $C_1/L_9$ circuit at resonance for the output frequency of inverter 20 results in a substantially sinusoidal inverter output voltage, $V_{out}$, and output current, $I_{out}$ (at terminals 3 and 4), as graphically illustrated in FIG. 3. FIG. 4 graphically illustrates that the voltage across capacitor $C_1$, namely $V_{C1}$, is driven to its limiting lower value of zero volts as a result of capacitor $C_1$ being in resonance with coil $L_9$ at the ripple frequency of 120 Hz. $V_{C1}$ is the applied voltage to the input of inverter 20 (at terminals 1 and 2). FIG. 4 also illustrates the ripple current, $I_{Lg}$, through reactor $L_g$. The impedance of reactor $L_g$ is generally selected to be much greater than the impedance of $C_1$ to block feedback of harmonics from the inverter circuit to the rectifier's power source. FIG. 5 graphically illustrates the voltage, $V_s$, across one of the solid state switches in inverter 20, and the current, $I_s$, through one of the switches at maximum power output when there is zero overlap angle between $V_s$ and $I_s$. Switching device turn-off at zero volts for $V_s$ when dc ripple has reached zero (e.g., at 240.0 milliseconds (ms) in FIG. 4 and FIG. 5), will minimize switching loses. Additionally, since switching commutation occurs at zero voltage in this example, any spikes due to stray circuit inductance will be significantly less than in a conventional inverter having low ac ripple current in the dc link voltage. This specific example is provided to illustrate the practice of the invention, which is not limited to the specific elements and values used in this example.

Figure 6:
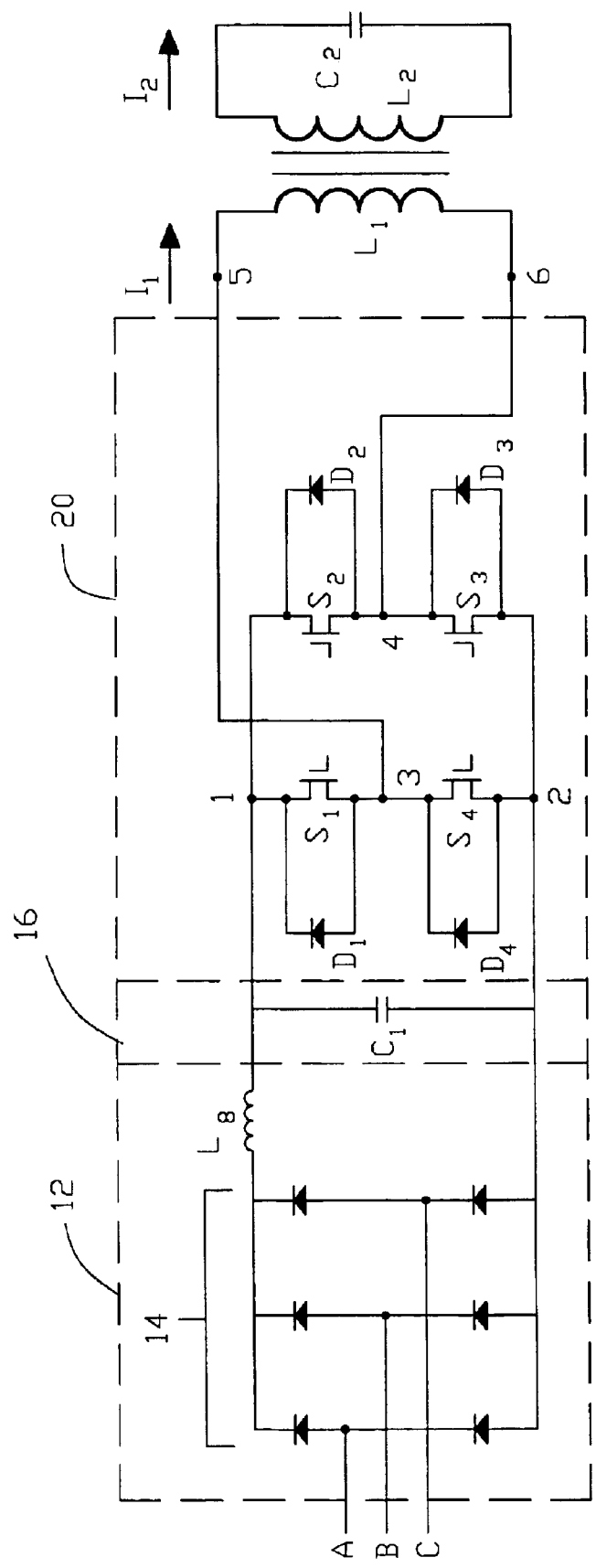
FIG. 6 is a schematic diagram of another example of the power supply of the present invention for use in induction heating or melting applications.

FIG. 6 illustrates a second example of the present invention. In this example, the load coil consists of an active coil $L_1$ and at least one passive coil $L_2$. Coils $L_1$ and $L_2$ may be wound in one of various configurations, such as sequentially or overlapped, to accomplish mutual magnetic coupling of the coils as further described below. Coil $L_1$ is connected to the output of inverter 20. Coil $L_2$ is connected in parallel with resonant tuning capacitor $C_2$ to form a parallel tank resonant circuit. Coil $L_2$ is not physically connected to coil $L_1$. The parallel tank resonant circuit is energized by magnetically coupling coil $L_2$ with the magnetic field generated in coil $L_1$ when current supplied from the output of inverter 20 flows through coil $L_1$.

Figure 7:
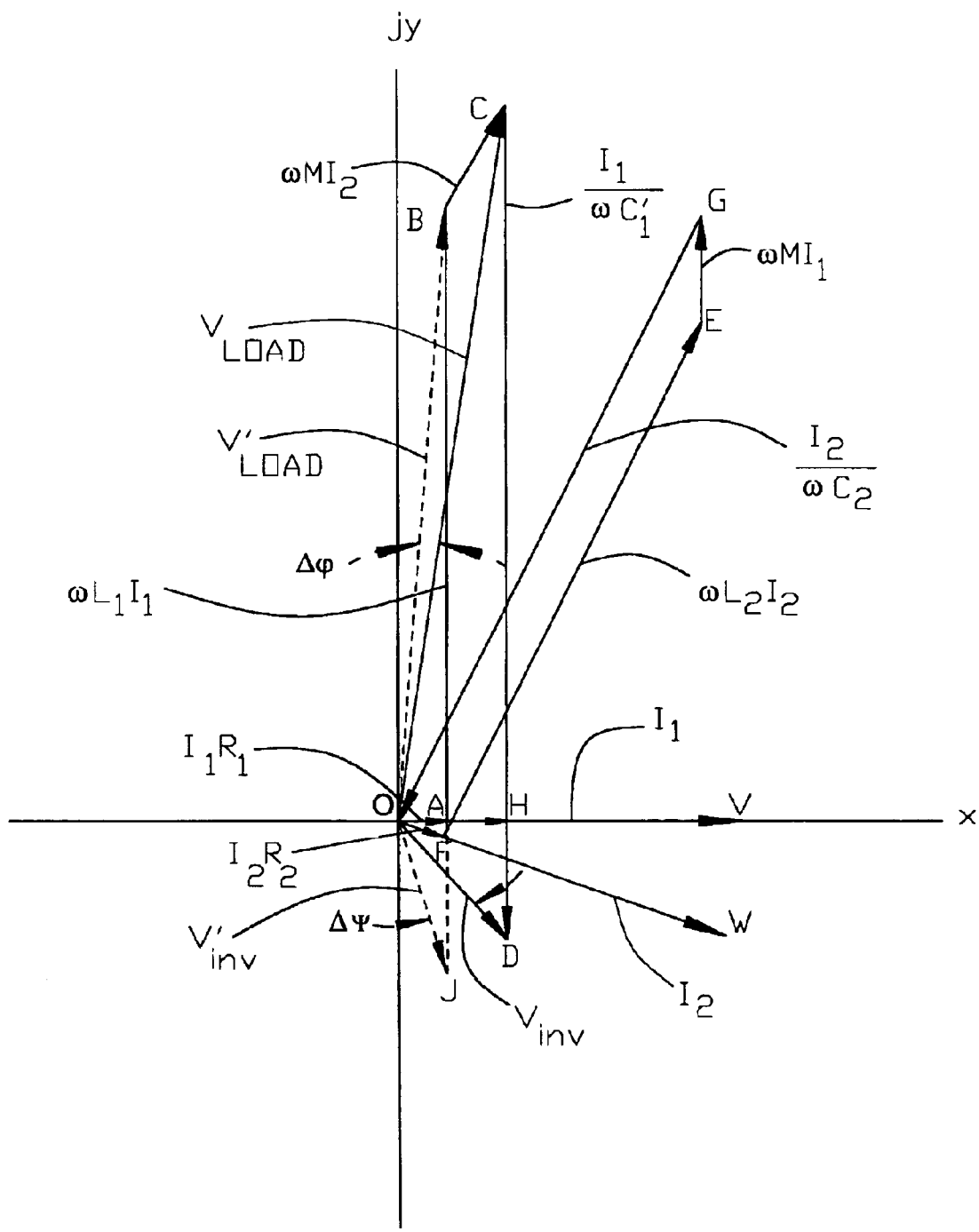
FIG. 7 is a vector diagram illustrating the advantages of an induction heating or melting system with the power supply of the present invention used with the load coil system illustrated in FIG. 6.

The benefit of separate active and passive coils can be further appreciated by the vector diagram shown in FIG. 7. In the figure, with respect to the active coil circuit, vector OV represents current $I_1$ in active coil $L_1$ as illustrated FIG. 6. Vector OA represents the resistive component of the active coil's voltage, $I_1R_1$ ($R_1$ not shown in the figures). Vector AB represents the inductive component of the active coil's voltage, $\omega L_1 I_1$ (where $\omega$ equals the product of $2\pi$ and f, the operating frequency of the power supply). Vector BC represents the voltage, $\omega M I_2$, induced by the passive coil $L_2$ onto active coil $L_1$. The half-wave ripple voltage $V_{C1}$ across capacitor $C_1$ and the switching function of the two switch pairs $S_1/S_3$ and $S_2/S_4$ produce the effect of a pseudo capacitor $C_1'$ connected in series with $L_1$ that would result in a sinusoidal voltage at terminals 5 and 6 in FIG. 6. Vector CD represents the voltage, $I_1/\omega C_1'$, that would appear across this pseudo series capacitor $C_1'$. Vector OD represents the output voltage, $V_{inv}$, of the inverter (terminals 3 and 4 in FIG. 6).

With respect to the passive coil circuit, vector OW represents current $I_2$ in passive coil $L_2$ that is induced by the magnetic field produced by current $I_1$. Vector OF represents the resistive component of the passive coil's voltage, $I_2R_2$ ($R_2$ not shown in the figures). Vector FE represents the inductive component of the active coil's voltage, $\omega L_2 I_2$. Vector EG represents the voltage, $\omega M I_1$, induced by the active coil $L_1$ onto passive coil $L_2$. Vector GO represents the voltage, $I_2/\omega C_2$, on capacitor $C_2$, which is connected across passive coil $L_2$.

The active coil circuit is driven by the voltage source, $V_{inv}$, which is the output of inverter 20, while the passive coil loop is not connected to an active energy source. Since the active and passive coils are mutually coupled, vector BC is added to vector OB, $V'_{LOAD}$, which represents the voltage across an active induction load coil in the absence of a passive capacitive load coil circuit, to result in vector OC, $V_{LOAD}$, which is the voltage across an active load coil with a passive capacitive load coil circuit of the present invention. The resultant load voltage, $V_{LOAD}$, has a smaller lagging power factor angle, $\phi$ (counterclockwise angle between the x-axis and vector OC), than the conventional load coil as represented by vector OB. As illustrated in FIG. 7, there is a power factor angle improvement of $\Delta\phi$.

In the present invention, the inductive impedance in the passive coil is substantially compensated for by the capacitive impedance (i.e., $\omega L_2 \approx 1/\omega C_2$). The uncompensated resistive component, $R_2$, in the passive coil circuit is reflected into the active coil circuit by the mutual inductance between the two circuits, and the effective active coil circuit's resistance is increased, thus improving the power factor angle, or efficiency of the coil system.

Further the power factor angle, $\Psi$, for the output of the inverter improves by $\Delta\Psi$ as illustrated by the angle between vector OJ, $V'_{inv}$ (resultant vector of resistive component vector OA and capacitive component vector AJ in the absence of a passive load coil circuit) and vector OD, $V_{inv}$ (resultant vector of resistive component vector OH and capacitive component vector HD with a passive load coil circuit of the present invention).

In other examples of the invention multiple active and/or passive coil circuits may be used to achieve a desired multiple coil arrangement for a particular application.

Figure 8:
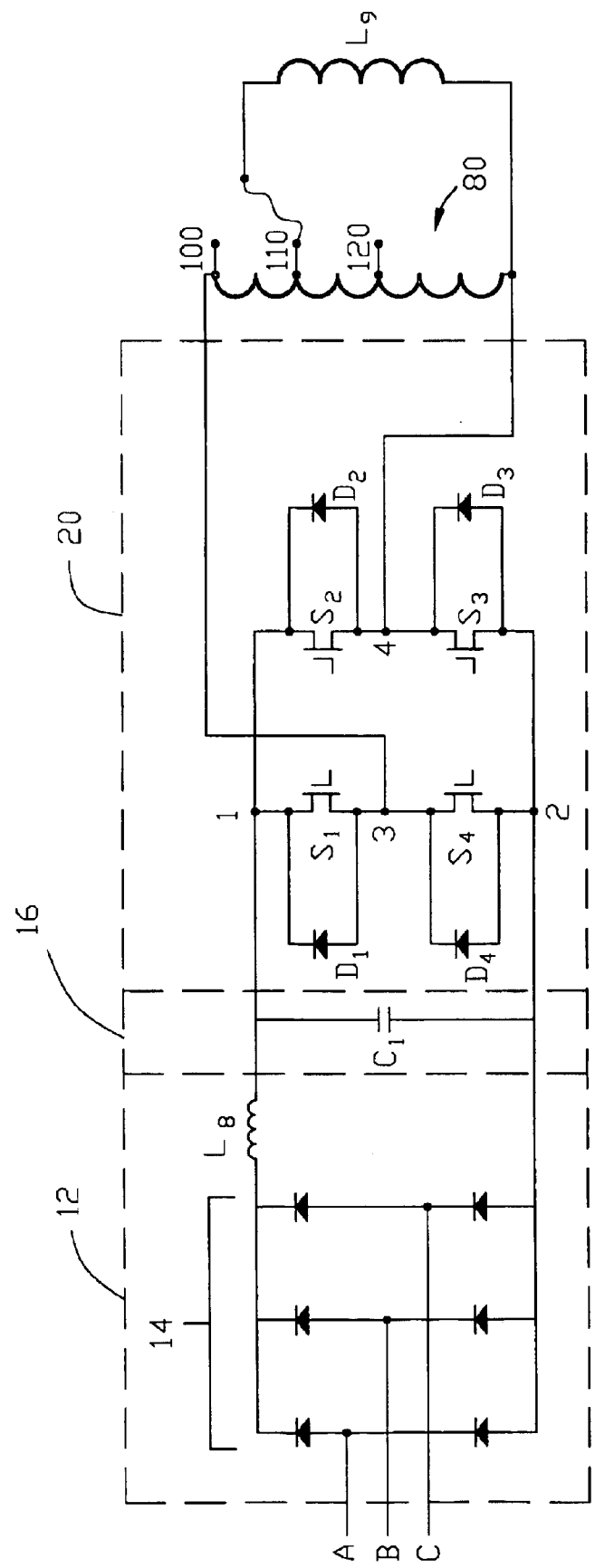
FIG. 8 is a schematic diagram of another example of the power supply of the present invention for use in induction heating or melting applications.

FIG. 8 illustrates another example of the power supply of the present invention. In this example autotransformer 80 is connected to the ac output of the inverter. The autotransformer has a first output terminal and a plurality (at least two) of second output terminals typically represented by autotransformer taps 100, 110 and 120 in FIG. 8. The first terminal of induction load coil $L_9$ is connected to the autotransformer's first output terminal. The second terminal of the induction load coil is alternatively connected to one of the plurality of the autotransformer's second output terminals. The circuit impedance of the autotransformer changes with the connected tap, which changes the load circuit impedance so that the power supply in FIG. 8 can selectively operate at approximate resonance at different output frequencies from the power supply. This is of advantage, for example, when an electrically conductive material is being inductively heated. As known in the art inductively heating at different frequencies will change the depth of induced heat penetration of the material. When different depths of heating are required the tap on the autotransformer can be changed to achieve this result with the power supply operating at approximate resonant frequency.

Figure 9:
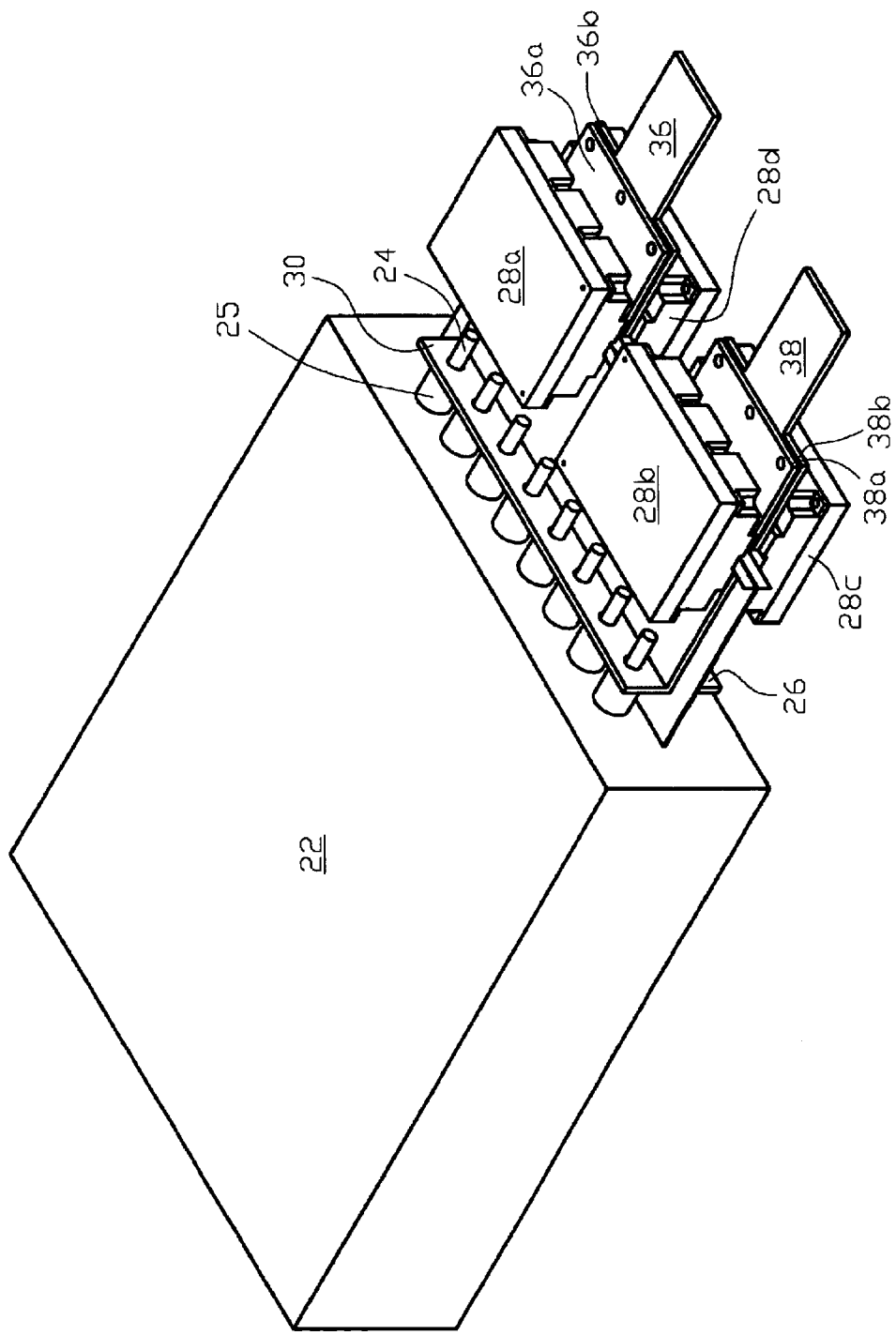
FIG. 9 is an isometric of one example of the physical arrangement of the inverter and tuning capacitor used in the power supply of the present invention.
Figure 10:
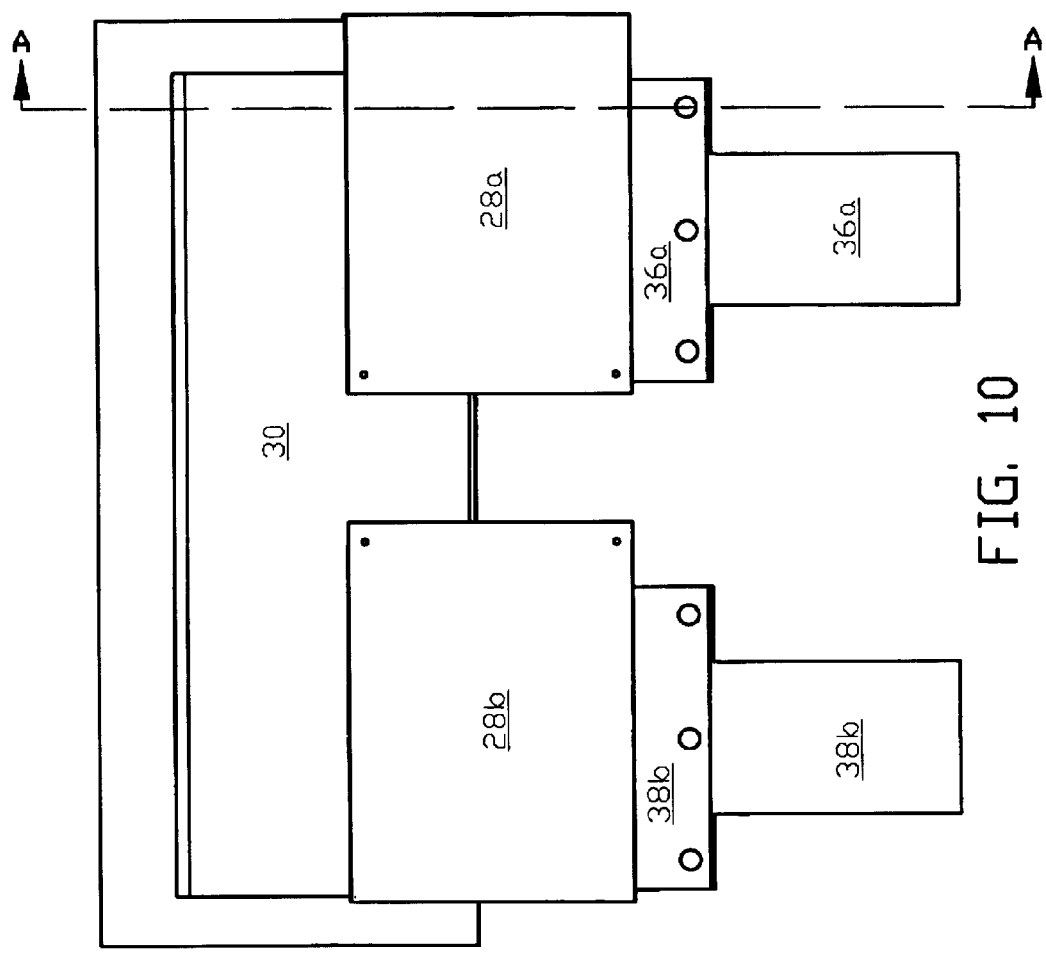
FIG. 10 is a top view of one example of the physical arrangement of the inverter used in the power supply of the present invention.

FIG. 9 illustrates one example of the physical arrangement for coil tuning capacitor $C_1$ and inverter elements, namely solid state switches $S_1$, $S_2$, $S_3$ and $S_4$ and associated antiparallel diodes $D_1$, $D_2$, $D_3$ and $D_4$, respectively, for the power supply of the present invention. This arrangement is particularly favorable for minimizing stray inductance associated with connections to the coil tuning capacitor and dc connections to the inverter elements. In this arrangement, coil tuning capacitor $C_1$ is contained within enclosure 22 as further described below. In FIG. 9 one or more physical terminals 24 represent electrical terminal 60 of capacitor C, as shown in FIG. 2; similarly one or more physical terminals 26 (best seen in FIG. 11(a)) represent electrical terminal 62 of capacitor $C_1$. Electrical insulators 25 may be provided for electrical isolation between the electrical conductors and enclosure 22. Each solid state switch and its associated antiparallel diode may be physically provided as an integrally packaged switch/diode assembly 28a, 28b, 28c and 28d as shown in FIG. 9 and FIG. 2. The four switch/diode assemblies are connected to form a full bridge inverter. First switch/diode assembly 28a and second switch/diode assembly 28b form a first pair of switch/diode assemblies that both have a first terminal connected to the positive connection of coil tuning capacitor $C_1$; third switch/diode assembly 28c and fourth switch/diode assembly 28d form a second pair of switch/diode assemblies that both have a first terminal connected to the negative connection of coil tuning capacitor $C_1$. The first terminals of the first and second pairs of switch/diode assemblies form the dc input to the inverter. The second terminals of the first and fourth switch/diode assemblies are connected to a first ac output (AC1) of the inverter; the second terminals of the second and third switch/diode assemblies are connected to a second ac output (AC2) of the inverter. In FIG. 9 physical electrical conductor 30, represented by circuit terminal 1 in FIG. 2, connects positive capacitor physical terminals 24 (electrical terminal 60) to the terminals of switch/diode assemblies 28a and 28b that correspond to electrical terminals 1 in FIG. 2. Similarly physical electrical conductor 34, represented by circuit terminal 2 in FIG. 2, and connects negative capacitor physical terminals 26 (electrical terminal 62) to the terminals of switch/diode assemblies 28c and 28d that correspond to electrical terminals 2 in FIG. 2. Physical electrical conductor 36 (via intermediate electrical conductors 36a and 36b joined together at electrically conductive connection 36c as shown in FIG. 11(a) in this non-limiting example of the invention) is represented by circuit terminal 3 in FIG. 2, and connects terminals of switch/diode assemblies 28a and 28d (corresponding to first ac electrical terminal 3 in FIG. 2) to a first terminal of induction load coil $L_9$ (not shown in FIG. 10). Similarly physical electrical conductor 38 (via intermediate electrical conductors 38a and 38b joined together at a suitable electrically conductive connection not shown in the figures, in this non-limiting example of the inverter) is represented by circuit terminal 4 in FIG. 2, and connects terminals of switch/diode assemblies 28b and 28c (corresponding to second ac electrical terminal 4 in FIG. 2) to a second terminal of induction load coil $L_9$ (not shown in FIG. 10). It is one object of the present invention to keep the inductance in the physical connections between the tuning capacitor and dc input to the inverter as low as possible. Therefore, conductors 30 and 34 are preferably formed from a thin sheet material such as copper and sandwiched together with a thin layer of high dielectric strength material 33 (such as a MYLAR based dielectric) between them. Minimal thickness of the conductors and insulation keeps stray inductance to a minimum. It is also preferable to keep all dimensions of conductors 30 and 34 to the minimum required to make suitable connections.

Similarly it is desirable to maintain a low inductance circuit for the coil tuning capacitor $C_1$. In one non-limiting arrangement of the invention, coil tuning capacitor $C_1$ comprises one or more wound film capacitors 60 shown in a typical arrangement in FIG. 12(a) and in partial cross section in FIG. 12(b). First capacitor conductor 61 is separated from adjacent second capacitor conductor 63 by dielectric layers 62 and 64. First capacitor conductor 61 extends to the top of the rolled capacitor, while second capacitor conductor 63 extends to the bottom of the rolled capacitor. A first electrical conductor in contact with the top of the rolled capacitor will form the first terminal of the capacitor and a second electrical conductor in contact with the bottom of the rolled capacitor will form the second electrical conductor.

In the arrangement shown in FIG. 13(a) and FIG. 13(b), capacitors 60a and 60b are arranged on opposing sides of first and second capacitor connecting electrical conductors 66 and 68, which are electrically separated by a dielectric 67. As with the conductors between the terminals of the coil tuning capacitor and the dc input to the inverter, in order to kept the inductance low, conductors 66 and 68 are preferably formed from a thin sheet material such as copper and sandwiched together with a thin layer of high dielectric strength material 67 (such as a MYLAR based dielectric) between them.

Capacitors 60a have their second (bottom) capacitor conductors 63 electrically in contact with first connecting electrical conductor 66. Capacitors 60b have their first (top) capacitor conductors 61 in contact with second connecting electrical conductor 68. Capacitors 60a have their first (top) capacitor conductors 61 electrically in contact with second connecting electrical conductor 68 by electrical conductor 70a, and capacitors 60b have their second (bottom) capacitor conductors 63 electrically in contact with first connecting electrical conductor 66 by electrical conductor 70b. Electrical conductors 70a and 70b may be in the form of a copper rod passing through the center (spool) of each capacitor with an extending electrical conducting element at each end so that the first end of the copper rod makes contact with a capacitor's conductor that is not in contact with either connecting electrical conductor 66 or 68, and the second end makes contact with either connecting electrical conductor 66 or 68. Electrical insulation 67 is provided around electrical conductors 70a and 70b so that they do not make electrical contact with a connecting electrical conductor that would short out a capacitor. The extending electrical conducting element may be in the form of a copper plate 70c. Connecting electrical conductors 66 and 68 extend out of enclosure 22 to form first and second capacitor terminals 24 and 26.

Figure 14:
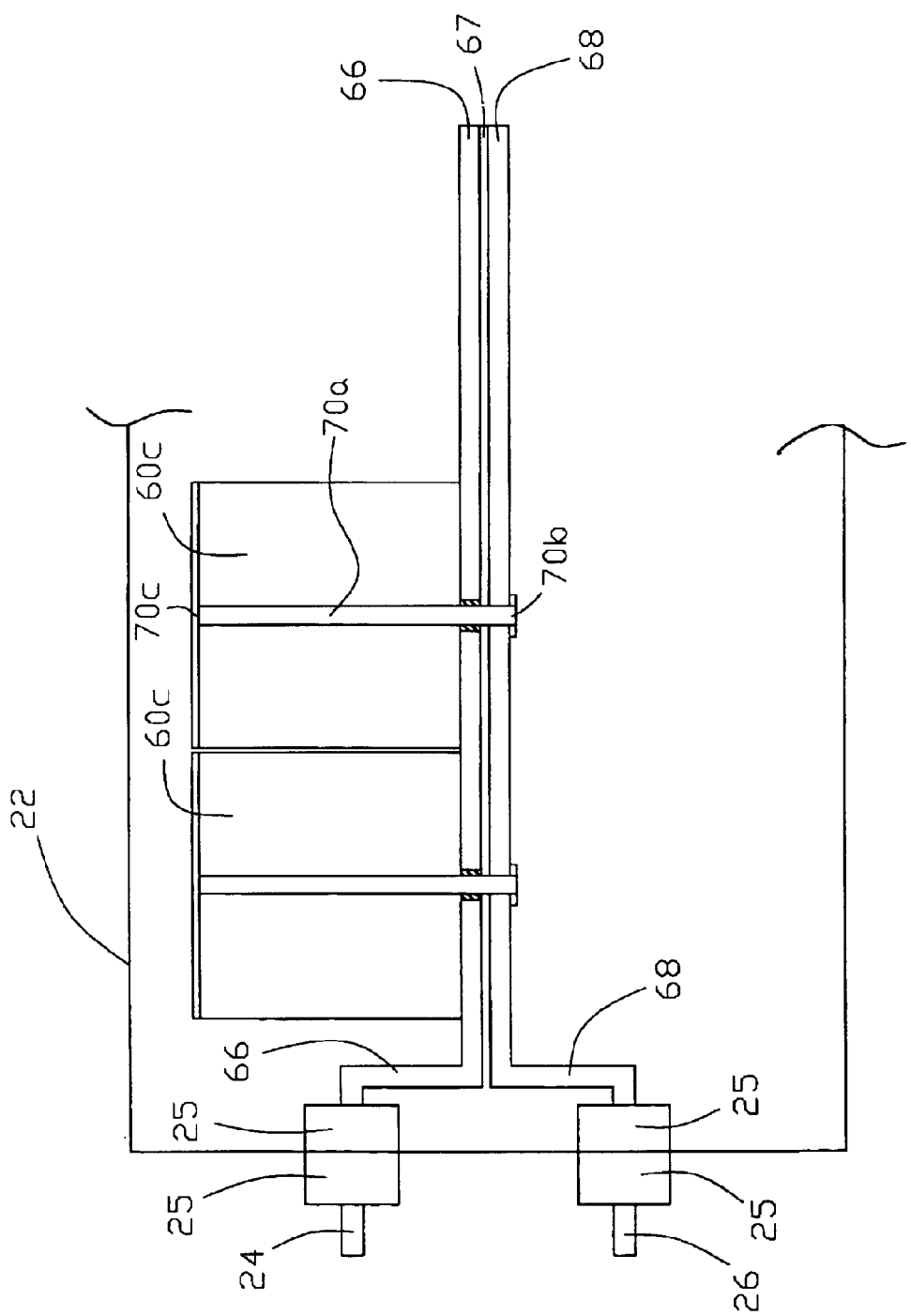
FIG. 14 is another example of the physical arrangement of the tuning capacitor shown in FIG. 9.

In the alternative arrangement shown in FIG. 14, capacitors 60c have their second (bottom) capacitor conductors 63 electrically connected to first connecting electrical conductor 66. The first (top) capacitor conductor 61 of each capacitor 60c is electrically connected to second connecting electrical conductor 68 via electrical conductors 70a with suitable extending electrical conducting elements 70c.

Figure 15:
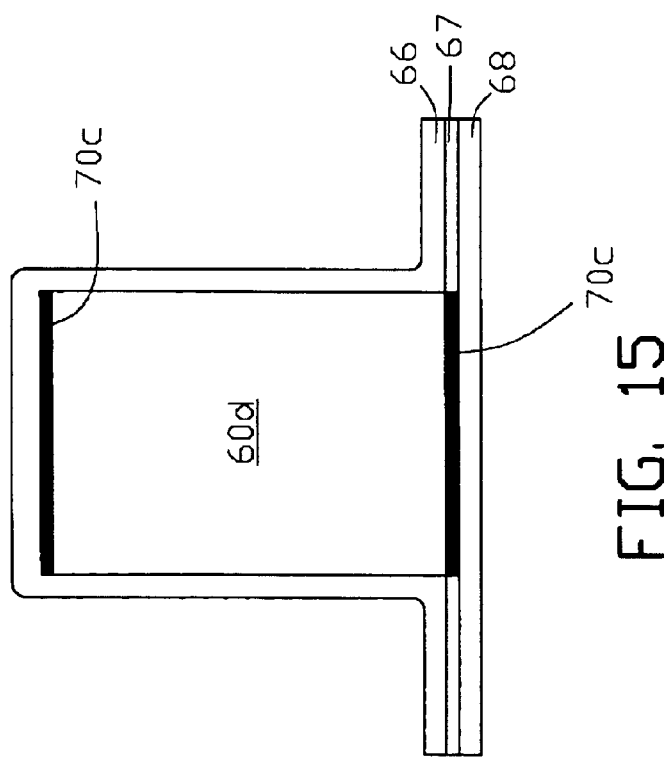
FIG. 15 is another example of the physical arrangement of the tuning capacitor shown in FIG. 9.

In the alternative arrangement shown in FIG. 15, first connecting electrical conductor 66 may be press fitted around one or more capacitors 60d. In this arrangement first (top) capacitor conductor 61 makes electrically contact with connecting electrical conductor 66 and second (bottom) capacitor conductor 63 makes electrical contact with connecting electrical conductor 68.

Figure 16:
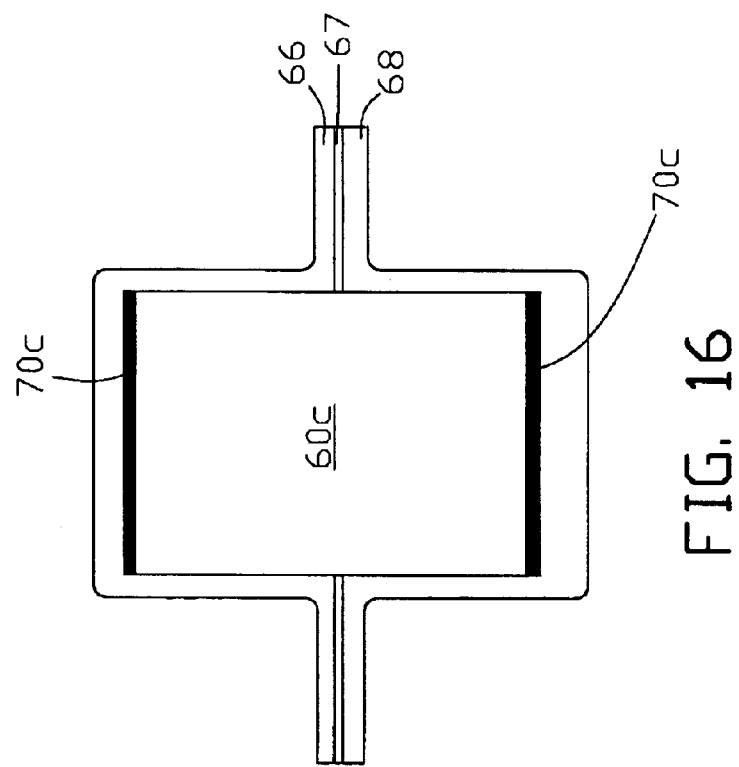
FIG. 16 is another example of the physical arrangement of the tuning capacitor shown in FIG. 9.

In the alternative arrangement shown in FIG. 16, first and second connecting electrical conductors 66 and 68 may be press fitted around one or more capacitors 60e. In this arrangement first (top) capacitor conductor 61 makes electrically contact with connecting electrical conductor 66 and second (bottom) capacitor conductor 63 makes electrical contact with connecting electrical conductor 68.

In all alternative arrangements of capacitors, conductors 66 and 68 are preferably formed from a thin sheet material such as copper and sandwiched together with a thin layer of high dielectric strength material 67 between them.

The examples of the invention include reference to specific electrical components. One skilled in the art may practice the invention by substituting components that are not necessarily of the same type but will create the desired conditions or accomplish the desired results of the invention. For example, single components may be substituted for multiple components or vice versa. Further one skilled in the art may practice the invention by rearranging components to create the desired conditions or accomplish the desired results of the invention. While the examples illustrate operation of the invention in full-bridge voltage-fed power supplies, the invention is applicable to other power supply topologies with appropriate modifications as understood by one who is skilled in the art.

The foregoing examples do not limit the scope of the disclosed invention. The scope of the disclosed invention is further set forth in the appended claims.

What is claimed is:

1. A power supply for inductively heating or melting an electrically conductive material, the power supply comprising:
   a rectifier for converting an ac input power into a dc output power at the output of the rectifier;
   an inverter having an input connected to the output of the rectifier, the inverter converting the dc output power of the rectifier into an ac output current supplied to an output of the power supply, the ac output current having a frequency equal to the operating frequency of the inverter;
   an at least one tuning capacitor connected across the output of the rectifier and the input of the inverter;
   an autotransformer connected to the output of the power supply, the autotransformer having a first autotransformer output terminal and a plurality of second autotransformer output terminals, the plurality of second autotransformer output terminals comprising at least two autotransformer taps; and
   an at least one inductive load coil connected across the first autotransformer terminal and one of the plurality of second autotransformer terminals, the at least one inductive load coil, in combination with the connected impedance of the autotransformer, having an impedance so that it is at least approximately in resonance with the at least one tuning capacitor at the operating frequency of the inverter, whereby the electrically conductive material is inductively heated or melted by a magnetic field generated from the flow of the ac output current through the at least one inductive load coil.

2. A method of inductively heating or melting an electrically conductive material, the method comprising the steps of:
   rectifying an ac input power into a dc output power;
   inverting the dc output power to produce an output ac current from an inverter at an operating frequency of the inverter;
   connecting the output ac current to an autotransformer, the autotransformer having a first autotransformer terminal and a plurality of second autotransformer terminals comprising at least two autotransformer taps;
   connecting an at least one inductive load coil across the first autotransformer terminal and one of the plurality of second autotransformer terminals to generate a magnetic field that magnetically couples with the electrically conductive material to inductively heat or melt the electrically conductive material; and
   forming an at least approximately resonant circuit at the operating frequency of the inverter with the at least one inductive load coil in combination with the connected impedance of the autotransformer, and an at least one tuning capacitor disposed across the dc output power.

3. A power supply for inductively heating or melting an electrically conductive material, the power supply comprising:

a rectifier for converting an ac input power into a dc output power at the output of the rectifier, the output of the rectifier comprising a positive dc bus and a negative dc bus;

an inverter having a dc input connected to the output of the rectifier, the inverter comprising a first pair of first and third switch/diode assemblies and a second pair of second and fourth switch/diode assemblies, the four switch/diode assemblies forming a full bridge inverter with the first and second switch/diode assemblies each having a first terminal, in combination the two first terminals forming a positive dc inverter input, the positive dc inverter input connected to the positive dc bus, and the third and fourth switch/diode assemblies each having a first terminal, in combination the two first terminals forming a negative dc inverter input, the negative dc inverter input connected to the negative dc bus, the first and fourth switch/diode assemblies having a second terminal commonly connected together to form a first ac inverter output connection, the second and third switch/diode assemblies having a second terminal commonly connected together to form a second ac inverter output connection, the inverter converting the dc output power of the rectifier into an ac output current supplied to an output of the power supply, the ac output current having a frequency equal to the operating frequency of the inverter;

an at least one tuning capacitor having a first and second tuning capacitor terminals, the first and second tuning capacitor terminals connected across the positive dc inverter input and the negative dc inverter input, respectively, the connection between the first tuning capacitor terminal and the positive dc inverter input formed from a thin electrically conductive sheet, the connection between the second tuning capacitor terminal and the negative dc inverter input formed from a second thin electrically conductive sheet, the first and second electrically conductive sheets separated by a thin layer of high dielectric electrical insulation and joined together to form a low inductance connection;

an at least one inductive load coil connected across the first and second ac inverter output connections, the at least one inductive load coil having an inductance so that it is at least approximately in resonance with the at least one tuning capacitor at the operating frequency of the inverter, whereby the electrically conductive material is inductively heated or melted by a magnetic field generated from the flow of the ac output current through the at least one inductive load coil.

4. The power supply of claim 3 wherein the at least one inductive load coil further comprises an active inductive load coil and an at least one passive inductive load coil, the at least one passive inductive load coil not connected to the active inductive load coil, the at least one passive inductive load coil connected in parallel with an at least one resonant passive circuit tuning capacitor to form a parallel tank resonant circuit, the passive inductive load coil magnetically coupled with the active inductive load coil when the ac output current flows through the active inductive load coil to induce a secondary ac current in the parallel tank resonant circuit, the impedance of the combination of the active inductive load coil and the parallel tank resonant circuit at least approximately in resonance with the impedance of the at least one tuning capacitor at the operating frequency of the inverter.

5. The power supply of claim 3 wherein the at least one tuning capacitor comprises a plurality of wound film capacitors, each of the plurality of wound film capacitors having a first and second capacitor conductors, all of the first capacitor conductors connected to a first electrically conductive capacitor sheet, and all of the second capacitor conductors connected to a second electrically conductive capacitor sheet, the first and second electrically conductive capacitor sheets separated by a thin layer of high dielectric electrical insulation and joined together to form a low inductance connection, the first electrically conductive capacitor sheet forming the first tuning capacitor terminal, and the second electrically conductive capacitor sheet forming the second tuning capacitor terminal.

6. The power supply of claim 5 wherein the plurality of wound film capacitors comprises a first group of wound film capacitors, each of the first group of wound film capacitors having their first capacitor conductors in contact with the first electrically conductive capacitor sheet, and a second group of wound film capacitors, each of the second group of wound film capacitors having their first capacitor conductors in contact with the second electrically conductive capacitor sheet, each of the first group of wound film capacitors having their second conductors in contact with the second electrically conductive capacitor sheet, and each of the second group of wound film capacitors having their first capacitor conductors in contact with the second electrically conductive capacitor sheet.

7. The power supply of claim 6 wherein at least either the first or second electrically conductive capacitor sheet is pressed at least partially over each of the plurality of wound film capacitors.

8. A method of inductively heating or melting an electrically conductive material, the method comprising the steps of:

rectifying an ac output power into a dc output power at the output of a rectifier, the output of the rectifier comprising a positive dc bus and a negative dc bus;

forming an inverter from a first pair of first and third switch/diode assemblies and a second pair of second and fourth switch/diode assemblies, the four switch/diode assemblies forming a full bridge inverter with the first and second switch/diode assemblies each having a first terminal, in combination the two first terminals forming a positive dc inverter input, the positive dc inverter input connected to the positive dc bus, and the third and fourth switch/diode assemblies each having a negative dc inverter input, the negative dc inverter input connected to the negative dc bus, the first and fourth switch/diode assemblies having a second terminal commonly connected together to form a first ac output inverter connection, the second and third switch/diode assemblies having a second terminal commonly connected together to form a second ac output inverter connection, the inverter converting the dc output power of the rectifier into an ac output current supplied to an output of the power supply, the ac output current having a frequency equal to the operating frequency of the inverter;

connecting an at least one tuning capacitor having a first and second tuning capacitor terminals across the positive and negative dc inverter inputs, the first connection between the first tuning capacitor terminal and the positive dc inverter input formed from a first thin electrically conductive sheet, the second connection between the second tuning capacitor terminal and the negative dc inverter input formed from a second thin electrically conductive sheet;

separating the first and second thin electrically conductive sheets separated by a thin layer of high dielectric electrical insulation;

joining the first and second thin electrically conductive sheets together with the intervening thin layer of high dielectric electrical insulation to form a low inductance connection;

connecting the first and second ac inverter outputs to an at least one inductive load coil to generate a magnetic field that magnetically couples with the electrically conductive material to inductively heat or melt the electrically conductive material; and forming an at least approximately resonant circuit at the operating frequency of the inverter with the at least one inductive load coil and an the least one tuning capacitor.

9. The method of claim 8 further comprising the steps of:

inductively coupling a passive inductive load coil to the magnetic field generated by the at least one inductive load coil, the passive inductive load coil connected in parallel with an at least one resonant passive circuit tuning capacitor to form a parallel tank resonant circuit; and forming an at least approximately resonant circuit at the operating frequency of the inverter with the impedance of the combination of the at least one inductive load coil and the parallel tank resonant circuit, and the at least one tuning capacitor.

10. The method of claim 8 further comprising the steps of: forming the at least one tuning capacitor from a plurality of wound film capacitors; connecting a first wound film capacitor terminal of each of the plurality of wound film capacitors to a first tuning capacitor connecting conductor, the first tuning capacitor connecting conductor formed from a third thin electrically conductive sheet; connecting a second wound film capacitor terminal of each of the plurality of wound film capacitors to a second tuning capacitor connecting conductor, the second tuning capacitor connecting conductor formed from a fourth thin electrically conductive sheet; separating the third and forth thin electrically conductive sheets separated by a thin layer of high dielectric electrical insulation; joining the third and fourth thin electrically conductive sheets together with the intervening thin layer of high dielectric electrical insulation to form a low inductance connection; forming the first tuning capacitor terminal from the third thin electrically conductive sheet; and forming the second tuning capacitor terminal from the fourth thin electrically conductive sheet.

* * * * *